United States Patent
Urban

(10) Patent No.: US 12,399,387 B1
(45) Date of Patent: Aug. 26, 2025

(54) POWERING A STACKED OPTICAL DIMMER

(71) Applicant: Meta Platforms Technologies, LLC, Menlo Park, CA (US)

(72) Inventor: Carl Thomas Urban, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 286 days.

(21) Appl. No.: 17/976,290

(22) Filed: Oct. 28, 2022

(51) Int. Cl.
| | |
|---|---|
| *G02C 7/10* | (2006.01) |
| *G02B 27/01* | (2006.01) |
| *G02F 1/1339* | (2006.01) |
| *G02F 1/1343* | (2006.01) |
| *G02F 1/1347* | (2006.01) |
| *G02F 1/137* | (2006.01) |

(52) U.S. Cl.
CPC ......... *G02C 7/101* (2013.01); *G02B 27/0172* (2013.01); *G02F 1/1339* (2013.01); *G02F 1/134309* (2013.01); *G02F 1/13439* (2013.01); *G02F 1/1347* (2013.01); *G02F 1/13725* (2013.01); *G02B 2027/0178* (2013.01); *G02F 2203/01* (2013.01)

(58) Field of Classification Search
CPC ........ G02B 27/0172; G02B 2027/0178; G02F 1/134309; G02F 1/13439; G02F 1/1347; G02F 2203/01
See application file for complete search history.

(56) References Cited

U.S. PATENT DOCUMENTS

| | | | |
|---|---|---|---|
| 2016/0209684 A1* | 7/2016 | Yasumoto | G02F 1/133512 |
| 2020/0111259 A1* | 4/2020 | Sears | G02B 27/0172 |
| 2024/0036366 A1* | 2/2024 | Cheng | G02F 1/133528 |
| 2024/0264492 A1* | 8/2024 | Zhang | G02F 1/13725 |

* cited by examiner

*Primary Examiner* — Mariam Qureshi
(74) *Attorney, Agent, or Firm* — Greenberg Traurig, LLP

(57) ABSTRACT

An optical dimmer including a stack of active dimming elements is disclosed. Each active dimming element includes a pair of transparent electrodes and an electroactive material between the electrodes. A first electrical bridge couples first transparent electrodes of the active dimming elements. A second electrical bridge couples second transparent electrodes of the active dimming elements. A powering structure is coupled to one of the active dimming elements for applying voltage to that active dimming element. The first and second electrical bridges couple the voltage to other active dimming element(s) of the stack. The first and second electrical bridges and the powering structure are spaced apart from one another along a perimeter of the stack, providing for a compact and customizable overall configuration.

20 Claims, 9 Drawing Sheets

POWERING A STACKED OPTICAL DIMMER

TECHNICAL FIELD

The present disclosure relates to visual displays and devices for controlling light brightness, and in particular to light dimmers usable in visual displays.

BACKGROUND

Visual displays provide information to viewer(s) including still images, video, data, etc. Visual displays have applications in diverse fields including entertainment, education, engineering, science, professional training, advertising, to name just a few examples. Some visual displays such as TV sets display images to several users, and some visual display systems such s near-eye displays (NEDs) are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed with the surrounding environment by seeing through a "combiner" component. The combiner of a wearable display is typically transparent to external light but includes some light routing optic to direct the display light into the user's field of view.

Because a display of HMD or NED is usually worn on the head of a user, a large, bulky, unbalanced, and/or heavy display device with a heavy battery would be cumbersome and uncomfortable for the user to wear. Consequently, head-mounted display devices can benefit from a compact and efficient configuration, including efficient display projectors, light dimmers, and high-efficiency combiner elements. Light dimmers may be used to reduce ambient light brightness for ease of observation of AR imagery provided by the display in bright illumination conditions.

BRIEF DESCRIPTION OF THE DRAWINGS

Exemplary embodiments will now be described in conjunction with the drawings, in which.

DETAILED DESCRIPTION

Figure 1:
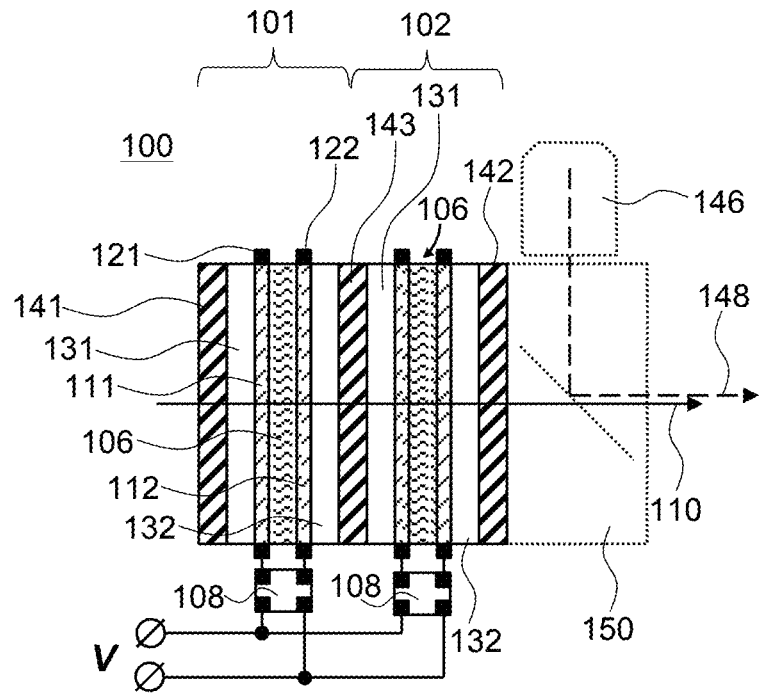
FIG. 1 is a schematic cross-sectional view of an optical dimmer and combiner elements of a near-eye display including separate powering connections.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1 to 10, similar numbers refer to similar elements.

An augmented reality (AR) near-eye display may include an optical dimmer for attenuating external light to make the AR generated imagery more visible to a user of the display. An active dimming element may include a liquid crystal layer between a pair of transparent electrodes, each optionally supporting a polarizer. Polarizerless configurations are also possible, including guest-host liquid crystals (GHLC), polymer-dispersed liquid crystals (PDLC), etc. Dimmers of many types may only provide an extinction ratio of up to about two orders of magnitude. Since brightness of the ambient light may vary by more than two orders of magnitude, a stack of active dimming elements may be used to increase the dynamic range of the external light attenuation. For simplicity, the dimming elements of the stack may be driven in parallel with a common electrical signal, providing same or similar degree of attenuation, with the total attenuation being a product of individual attenuations, or a sum of individual attenuations in dB units.

Since the electrodes of a liquid crystal cell of a dimming element are disposed close to one another (typically by 3-6 micrometers), providing both positive and negative powering electrical terminals to a dimming element may takes a considerable external space, and may result in an unacceptable increase of the overall size/footprint of the optical dimmer including several dimming elements. In accordance with this disclosure, the powering may be provided to one dimming element only, and the remaining dimming elements of the stack of dimming elements of the optical dimmer may be powered by electrical bridges coupling transparent electrodes of different dimming elements of the stack. Such electrical bridges may be implemented as a set of compact outside tabs. The peripheral tabs may be spaced apart from one another around the periphery of the dimming elements so as not to cause a significant increase of the overall size of the optical dimmer.

In accordance with the present disclosure, there is provided an optical dimmer comprising a stack of first and second active dimming elements. Each active dimming element includes first and second transparent electrodes and an electroactive material between them. The electroactive material has an optical property controllable by applying voltage between the first and second transparent electrodes. A first electrical bridge is provided between the first transparent electrodes of the first and second active dimming elements. A second electrical bridge between the second transparent electrodes of the first and second active dimming elements. A powering structure is coupled to the first and second transparent electrodes of the first active dimming element for applying voltage to the first element. The first and second electrical bridges and the powering structure are spaced apart from one another along a perimeter of the stack.

In some embodiments, the first and second electrical bridges and the powering structure are spaced apart from one another by an angle of at least 20 degrees w.r.t. an optical axis of the stack. The optical dimmer may include first and second peripheral electrode structures electrically coupled to periphery of the first and second transparent electrodes, respectively. The electrode structures may each include a conductive ring running around a respective conductive electrode.

The optical dimmer may further include a third electrical bridge between the first transparent electrodes of the first and second active dimming elements, a fourth electrical bridge between the second transparent electrodes of the first and second active dimming elements, and so on. All of the electrical bridges and the powering structure may be spaced apart from one another along a perimeter of the stack.

In some embodiments, the powering structure comprises a tab formed by extensions of the first and second transparent electrodes of the first active dimming element. At least one of the extensions may be bent away from the other one to form a gap. An insulating edge sealant may fill the gap, for improved mechanical stiffness and reliability.

In some embodiments, the first electrical bridge comprises a tab formed by an extension of a substrate supporting the first transparent electrodes of the first and second active dimming elements. The tab comprises a flexible layer wrapped around the extension to provide an electrical contact between the first transparent electrodes of the first and second active dimming elements. The second electrical bridge may include a tab formed by extensions of the second transparent electrodes of the first and second active dimming elements. At least one of the extensions may be bent towards the other one to provide an electrical contact between the second transparent electrodes of the first and second active dimming elements. The first and second active dimming elements may each further include first and second transparent substrates supporting the first and second transparent electrodes, respectively. The electroactive material may include liquid crystals, for example GHLC, PDLC, nematic liquid crystals, cholesteric liquid crystals, etc. For some types of liquid crystals e.g. nematic liquid crystals, the first and second active dimming elements may each include a linear transmission polarizer supported by the first transparent substrate.

In accordance with the present disclosure, there is provided a near-eye display comprising an optical dimmer of this disclosure, and a combiner element in an optical path of the external light downstream of the optical dimmer for adding image light to the external light for viewing by an eye of a user of the near-eye display. The combiner element may include e.g. a pupil-replicating lightguide in a stack configuration with the optical dimmer. A controller may be provided for causing the optical dimmer to dim the external light more when a brightness of the external light increases, so as to lessen an effect of the external light on legibility of an image conveyed by the image light to the eye of the user.

In accordance with the present disclosure, there is further provided a method for wiring an optical dimmer comprising a stack of first and second active dimming elements each comprising first and second transparent electrodes. The method comprises electrically bridging the first transparent electrodes of the first and second active dimming elements at a first location at a perimeter of the stack; electrically bridging the second transparent electrodes of the first and second active dimming elements at a second location at the perimeter of the stack; and providing a powering electrode structure to the first active dimming element at a third location at the perimeter of the stack. The first, second, and third locations are spaced apart from one another along the perimeter of the stack. The method may further include spacing apart the first, second, and third locations by an angle of at least 20 degrees from one another w.r.t. an optical axis of the stack.

Referring now to FIG. 1, an optical dimmer 100 includes first 101 and second 102 active dimming elements in a stack configuration. Each one of the first 101 and second 102 active dimming elements includes first 111 and second 112 transparent electrodes and an electroactive material 106, e.g. liquid crystals, between the first 111 and second 112 transparent electrodes. The active dimming elements 101, 102 may each include first 121 and second 122 peripheral ring electrodes around respective first 111 and second 112 transparent electrodes, and a powering structure 108 coupling external voltage V to the first 111 and second 112 transparent electrodes, as illustrated.

The first 111 and second 112 transparent electrodes of the first 101 and second 102 active dimming elements are supported by first 131 and second 132 transparent substrates (four substrates total in this example). The first 101 and second 102 dimming elements may each optionally include first 141 and second 142 linear transmission polarizers supported by outer surfaces of the first 131 and second 132 transparent substrates, respectively. The second linear polarizer 142 of the first active dimming element 101 and the first linear polarizer 141 of the second active dimming element 102 may be combined into a single intermediate linear transmission polarizer 143, as illustrated in FIG. 1.

In operation, the first linear transmission polarizer 141 of the first active dimming element 101 linearly polarizes impinging external light 110. The electroactive material 106 of the first active dimming element 101, e.g. liquid crystals, changes polarization of the external light 110 in dependence upon the magnitude of the voltage V. The intermediate linear transmission polarizer 143 propagates a portion of the impinging external light 110, depending on its polarization, thereby realizing the dimming function. The second active dimming element 102 operates in a similar manner as the first active dimming element 101, effectively doubling the overall achievable attenuation (in dB units). The dimming of the external light 110 relative to image light 148 emitted by a projector 146 and combined with the external light 110 by means of a combiner element 150 may make the image carried by the image light 148 more visible.

The optical dimmer 100 of FIG. 1 requires two powering structures 108, one per active dimming element. A powering structure for an LC cell tends to be long due to the proximity of the first 111 and second 112 transparent electrodes sandwiching a thin layer (a few micrometers) of the electroactive material 106. One approach to powering is to laterally offset the first 111 and second 112 transparent electrodes, creating a couple of tabs, or one wide tab, on perimeter of the active dimming element. Another approach (for flexible substrates) is to gradually bend the two substrates away form one another, creating a single but rather elongated powering tab. The expanded and/or elongate tabs occupy much space, which may be difficult to accommodate in compact and eyeglasses-like near-eye display configurations.

In accordance with this disclosure, powering of a stacked optical dimmer may be facilitated by providing compact electrical bridge structures on the dimmers periphery. Referring for a non-limiting illustrative example to FIG. 2A, an optical dimmer 200A includes similar elements as the optical dimmer 100 of FIG. 1. The optical dimmer 200A of FIG. 2A includes first 201 and second 202 active dimming elements in a stack configuration. Each one of the first 201 and second 202 active dimming elements includes first 211 and second 212 transparent electrodes with an electroactive material 206 between the first 211 and second 212 transparent electrodes. The electroactive material 206 has an optical property, such as birefringence or optical transmission, controllable by applying electrical signal, e.g. voltage, between the first 211 and second 212 transparent electrodes. The active dimming elements 201, 202 may each include first 221 and second 222 peripheral ring electrodes around respective first 211 and second 212 transparent electrodes. A powering structure 208 may couple external voltage V to the first 211 and second 212 transparent electrodes of the first active dimming element 201, as illustrated.

Figure 2A:
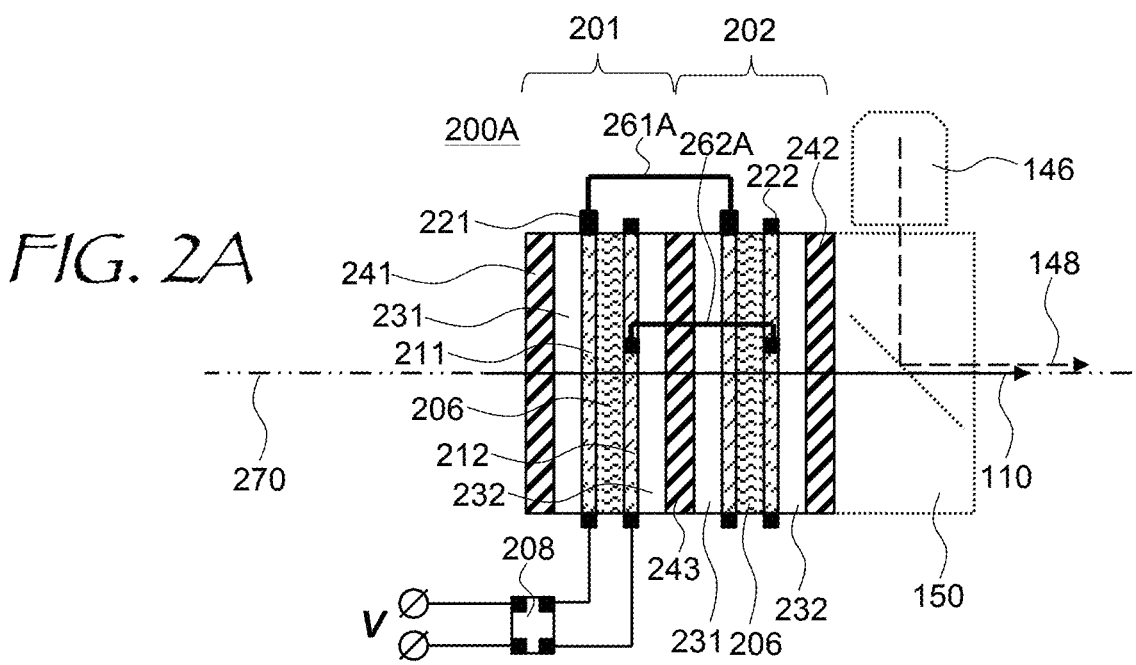
FIG. 2A is a schematic cross-sectional view of an optical dimmer and combiner elements of a near-eye display including a shared powering connection with bridged distal electrodes of dimming elements of the optical dimmer and bridged proximal electrodes.

The first 211 and second 212 transparent electrodes of the first 201 and second 202 active dimming elements may be supported by first 231 and second 232 transparent substrates (four substrates total the optical dimmer 200A of FIG. 2A). The first 201 and second 202 dimming elements may each include first 241 and second 242 linear transmission polarizers supported by outer surfaces of the first 231 and second 232 transparent substrates, respectively. The second linear polarizer 242 of the first active dimming element 201 and the first linear polarizer 241 of the second active dimming element 202 may be combined into a single intermediate linear transmission polarizer 243, as illustrated in FIG. 2A. In some embodiments, the first 231 and second 232 transparent substrates and the intermediate linear transmission polarizer 243 may be combined into a single element. Polarizer-free configurations are also possible with some types of liquid crystals (e.g. GHLC, PDLC).

To power the second active dimming element 202, first 261A and second 262A electrical bridges may be provided. The first electrical bridge 261A electrically couples the first transparent electrodes 211 (distal w.r.t. the eye location) of the first 201 and second 202 active dimming elements. The second electrical bridge 262A electrically couples the second transparent electrodes 212 (proximal w.r.t. the eye location) of the first 201 and second 202 active dimming elements. Such a configuration ensures that the voltage V is applied to not inly the first 201 but also the second 202 active dimming element. As illustrated, the first 261A and second 262A electrical bridges and the powering structure 208 are spaced apart from one another along a perimeter of the stack of the first 201 and second 202 active dimming elements. For example, the first 261A and second 262A electrical bridges and the powering electrode structure 208 may be spaced apart from one another by an angle of at least 20 degrees w.r.t. an optical axis 270 of the stack. In some embodiments, the first 261A and second 262A peripheral electrode structures may each include a conductive ring running around the respective conductive electrode.

In operation, the first linear transmission polarizer 241 of the first active dimming element 201 linearly polarizes impinging external light 110. The LC fluid of the first active dimming element 201 changes polarization of the external light 110 in dependence upon the magnitude of the voltage V. The intermediate linear transmission polarizer 243 propagates a portion of the impinging external light 110, depending on its polarization, thereby realizing the dimming function. Polarizerless configurations of the optical dimmer 200A may include GHLC, PDLC, etc., which may be implemented on flexible substrates.

The second active dimming element 202 operates in a similar manner as the first active dimming element 201, effectively doubling the overall achievable attenuation (in dB units). The dimming of the external light 110 relative to the image light 148 emitted by the projector 146 and combined with the external light 110 by means of the combiner element 150 may make the image carried by the image light 148 more visible, e.g. when the brightness of the external light 110 before entering the optical dimmer 200A is too high.

Figure 2B:
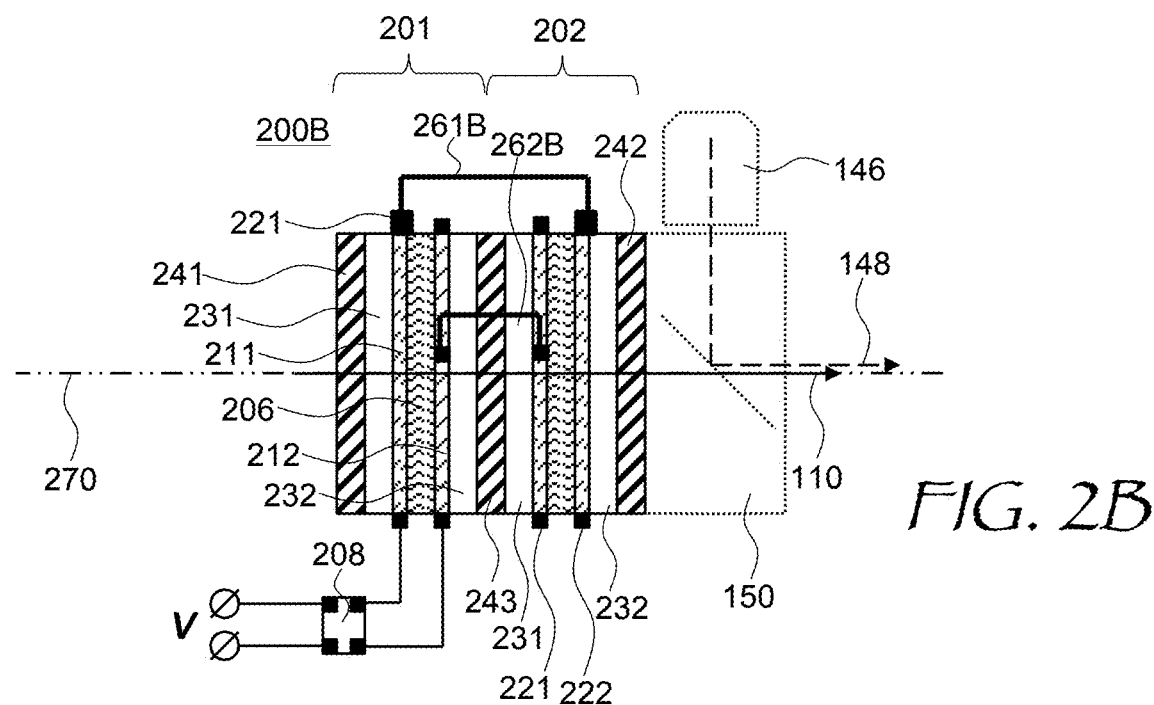
FIG. 2B is a schematic cross-sectional view of an optical dimmer and combiner elements of a near-eye display including a shared powering connection with bridged distal-proximal and proximal-distal electrodes of dimming elements of the optical dimmer.

Referring to FIG. 2B, an optical dimmer 200B is similar to the optical dimmer 200A of FIG. 2A, and includes similar elements. Briefly, the optical dimmer 200B of FIG. 2B includes the first 201 and second 202 active dimming elements in a stack configuration, which operate similarly as in the optical dimmer 200A, and may include optical polarizer or may be configured to operate without polarizers, e.g. by using GHLC, PDLC, etc.

One difference of the optical dimmer 200B of FIG. 2B from the optical dimmer 200A of FIG. 2A is the configuration of the optical bridges. The first electrical bridge 261B electrically couples the first transparent electrode 211 of the first active dimming element 201 to the second transparent electrode 212 of the second active dimming element 202. The second electrical bridge 262B electrically couples the second transparent electrode 212 of the first active dimming element 201 to the first transparent electrode 211 of the second active dimming element 202. The second active dimming element 202 is driven in the "reverse" direction relative to the first active dimming element 201. Since the LC molecules are typically responsive to the magnitude and not the polarity of the applied electric field, the performance of the second active dimming element will be unaffected.

The second active dimming element 202 operates in a similar manner as the first active dimming element 201, effectively doubling the overall achievable attenuation (in dB units). The dimming of the external light 110 relative to the image light 148 emitted by the projector 146 and combined with the external light 110 by means of the combiner element 150 may make the image carried by the image light 148 more visible, e.g. when the brightness of the external light 110 before entering the optical dimmer 200B is too high.

As in the example of FIG. 2A, the electrical bridge configuration in the optical dimmer 200B of FIG. 2B ensures that the voltage V is applied to not inly the first 201 but also the second 202 active dimming element. The first 261A and second 262A electrical bridges and the powering structure 208 may be spaced apart from one another along a perimeter of the stack of the first 201 and second 202 active dimming elements. For example, the first 261A and second 262A electrical bridges and the powering electrode structure 208 may be spaced apart from one another by an angle of at least 20 degrees w.r.t. an optical axis 270 of the stack.

It is to be understood that the labeling of various elements as "first", "second", etc. in this disclosure does not imply their geometrical or functional order. The words like "first", "second", "third" etc. are merely used as unique identifiers of respective elements. For example, the "first" transparent electrode may be an upstream (distal) electrode or a downstream (proximal) electrode, and the "second" transparent electrode may be accordingly downstream or upstream electrode w.r.t. the direction of the impinging external light 110. Thus, the language "first electrical bridge couples the first transparent electrodes of the first and second active dimming elements" relates to both cases of FIG. 2A and FIG. 2B. Similarly, the language "second electrical bridge couples the second transparent electrodes of the first and second active dimming elements" applies to both cases of FIG. 2A and FIG. 2B.

Figure 3:
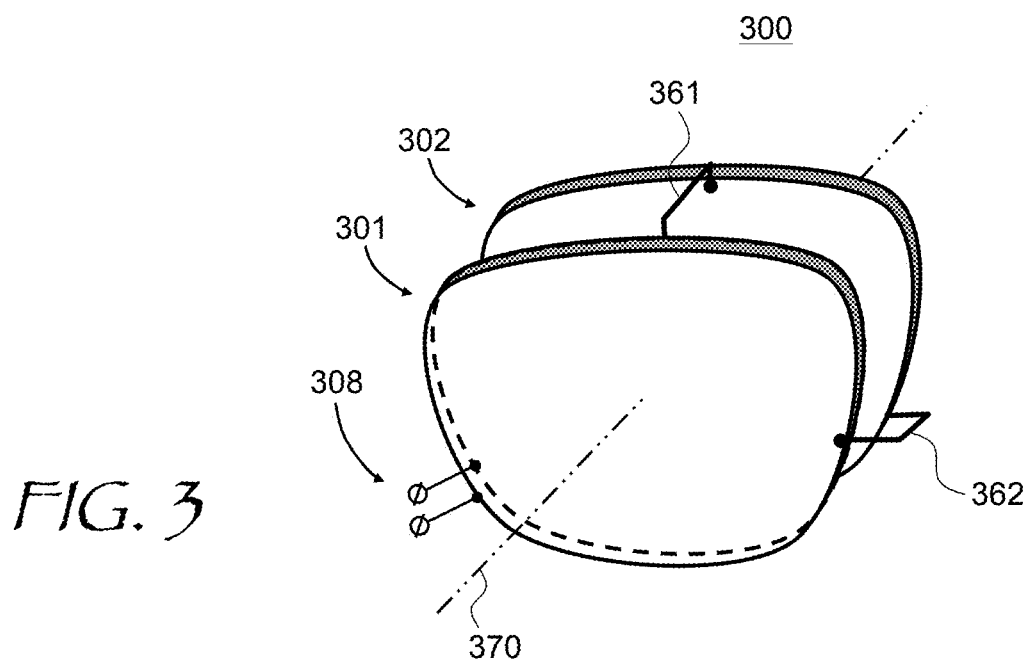
FIG. 3 is an exploded isometric view of an optical dimmer having a shape of an eyeglass.

FIG. 3 illustrates one example of an optical dimmer for an AR display device having a shape of an eyeglass of a pair of eyeglasses. An optical dimmer 300 of FIG. 3, shown in an exploded view, includes similar elements as the optical dimmer 200B of FIG. 2B, and has the electrical connection pattern of the optical dimmer 200B of FIG. 2B. The optical dimmer 300 of FIG. 3 includes a stack of first 301 and second 302 active dimming elements corresponding to the active dimming elements 201 and 202 of the optical dimmer 200B of FIG. 2B. The optical dimmer 300 (FIG. 3) includes first electrical bridge 361 between inner transparent electrodes of the first 301 and second 302 active dimming elements, and a second electrical bridge 362 between outer transparent electrodes of the first 301 and second 302 active dimming elements. A powering structure 308 is coupled to the first active dimming element 301 for applying voltage to the first active dimming element 301. The powering structure 308, the first electrical bridge 361, and the second electrical bridge 362 are disposed at about 120 degrees to each other w.r.t. an optical axis 370 of the optical dimmer 300.

More than two dimming elements may be connected in the above manner. Referring for a non-limiting illustrative example to FIG. 4, an optical dimmer 400 is shown in an exploded view. The optical dimmer 400 includes a stack of three active dimming elements 401, 402, and 403 shown in an exploded view for convenience. The active dimming elements 401, 402, and 403 are electrically coupled by first 461, second 462, third 463, and fourth 464 electrical bridges spaced apart from one another along a perimeter of the stack. The powering voltage is applied to the first active dimming element 401 by means of a powering structure 408. More active dimming elements may be provided in this manner if required. The powering structure 408 and the electrical bridges may be spaced evenly or unevenly.

Figure 4:
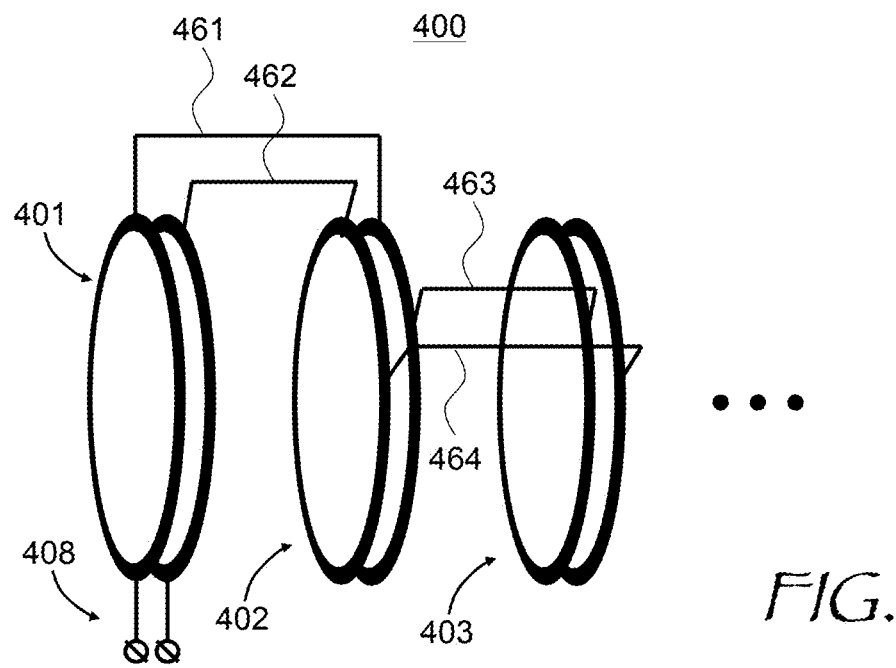
FIG. 4 is a schematic three-dimensional view of a cascaded optical dimmer.
Figure 5:
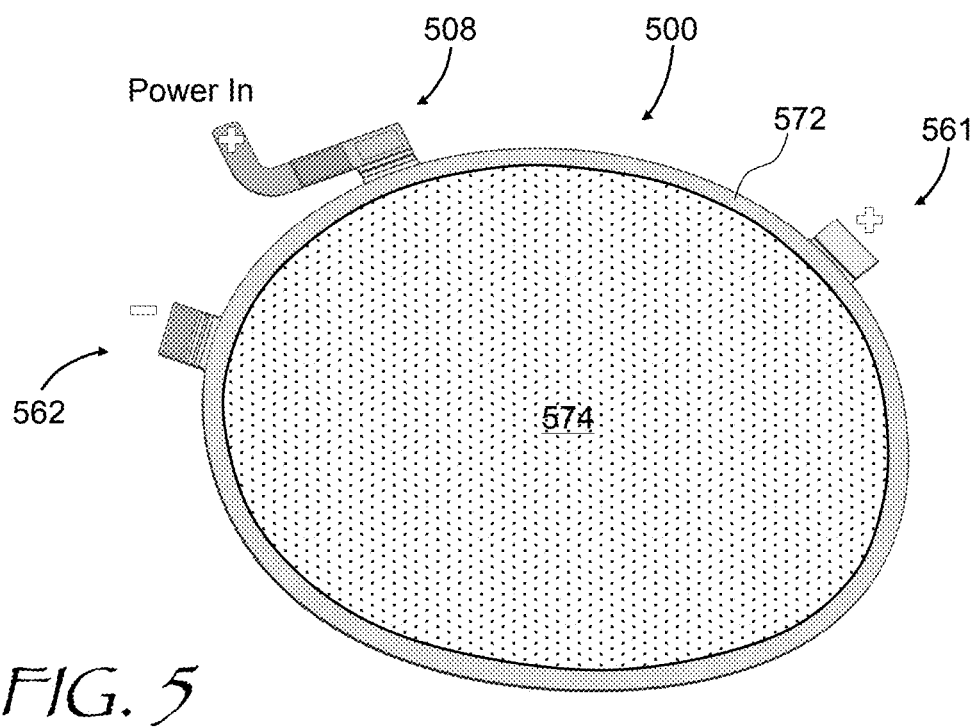
FIG. 5 is a plan view of an optical dimmer including two electrical bridge tabs and one powering tab.

Non-limiting illustrative examples of implementation of the optical dimmer 200A of FIG. 2A, the optical dimmer 200B of FIG. 2B, the optical dimmer 300 of FIG. 3, and the optical dimmer 400 of FIG. 4 will now be presented. Referring first to FIG. 5, an optical dimmer 500 is shown in plan view. The optical dimmer 500 has a form factor of an eyeglass of a pair of eyeglasses. The optical dimmer 500 includes a stack of two polarizerless dimming elements having a perimeter edge seal 572 and a common clear aperture, or an active dimming region 574. A powering tab 508 includes a powering structure for applying an electrical signal to one of the two dimming elements. A first bridge tab 561, denoted with "+" sign, electrically couples together positive electrodes of the two dimming elements. A second bridge tab 562, denoted with "−" sign, electrically couples together negative electrodes of the two dimming elements, thus providing electrical power to the other one of the two dimming elements. It is to be noted that the terms "positive" and "negative" are meant as mere identifiers, as the powering signal is in most cases a square-wave bipolar AC signal for better life expectancy of the liquid crystal cells.

The electrical connections to the transparent electrodes, such as indium tin oxide (ITO) layers, may be made outside of the edge seal 572 perimeter to opportunistically extend into product regions that have the space for them in overall mechanical configuration of the near-eye display. In the example presented in FIG. 5, the connections are small and spaced apart along the perimeter, i.e. along the edge seal 572, extending from the edge seal 572. This allows the rest of the perimeter to be as narrow as the edge sealing process allows for optimal appearance of the near-eye display. The layer connections can be duplicated and distributed around the perimeter to improve a layer-to-layer electrical contact and active dimming performance.

Figure 6A:
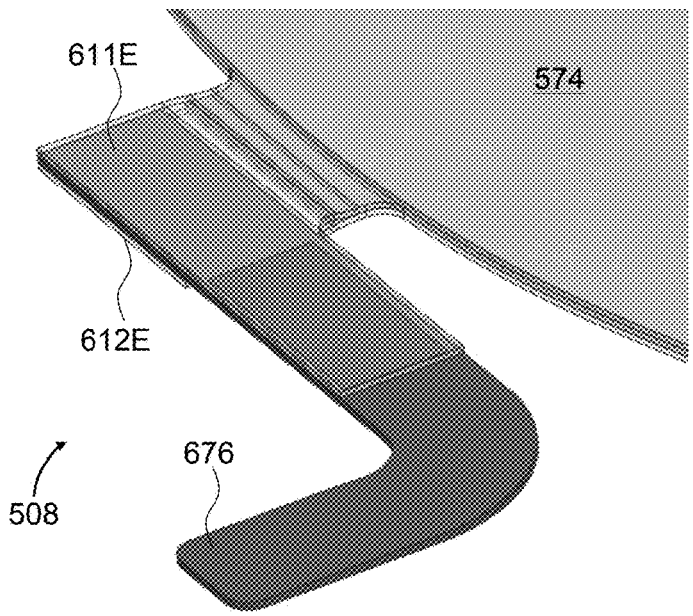
FIG. 6A is a three-dimensional view of the powering tab of the optical dimmer of FIG. 5.
Figure 6B:
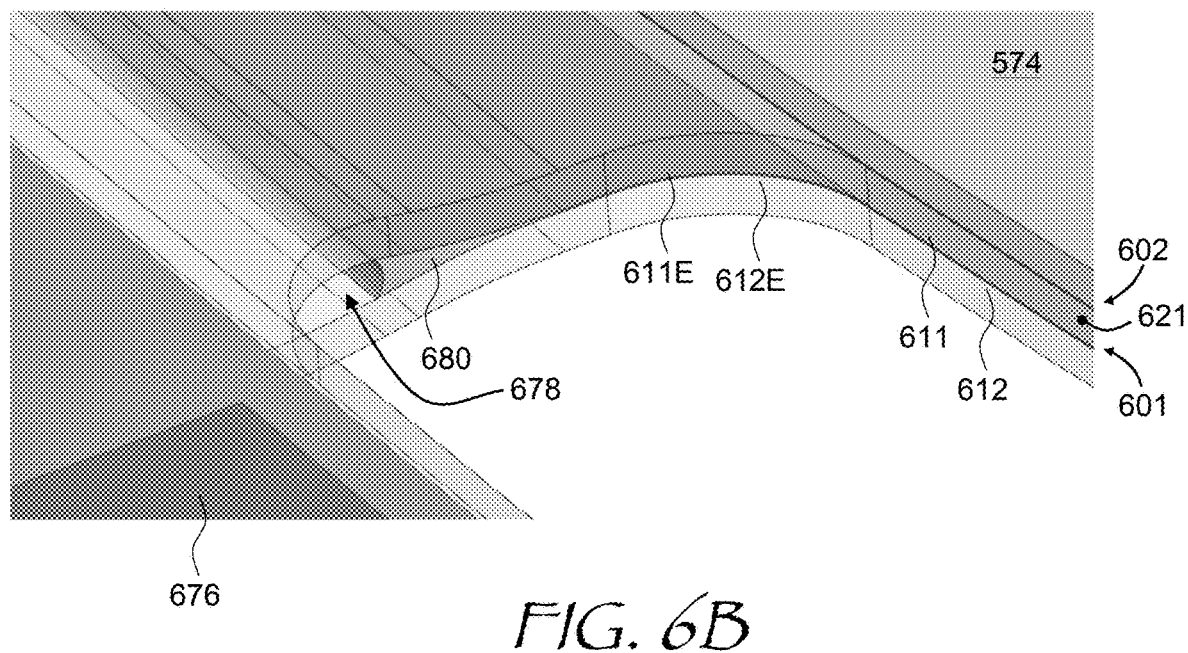
FIG. 6B is a three-dimensional zoomed-in view of the powering tab of FIG. 6A.

FIGS. 6A and 6B illustrate an example configuration of the powering tab 508, corresponding to the powering structure 208 of the optical dimmers 200A and 200B of FIGS. 2A and 2B, the powering structure 308 of the optical dimmer 300 of FIG. 3, and the powering structure 408 of the optical dimmer 400 of FIG. 4. The powering tab 508 (FIGS. 6A and 6B) is formed by extensions 611E and 612E of first 611 and second 612 transparent electrodes, respectively, of a first active dimming element 601 (FIG. 6B). The extensions 611E, 612E are bent away from each other, as best seen in FIG. 6B, for contacting opposed conductive surfaces of a thin and flexible power line layer 676, e.g. by means of an anisotropic conductive film (ACF). At least one of the extensions 611E, 612E may be bent away from the other one to form a gap 678 required to accommodate the flexible power line layer 676. The gap 678 may be filled with an insulating edge sealant 680 for protection against environment and better mechanical stability. A second active dimming element 602 is powered from the first active dimming element 601 by the first 561 and second 562 bridge tabs, as explained below.

Figure 7:
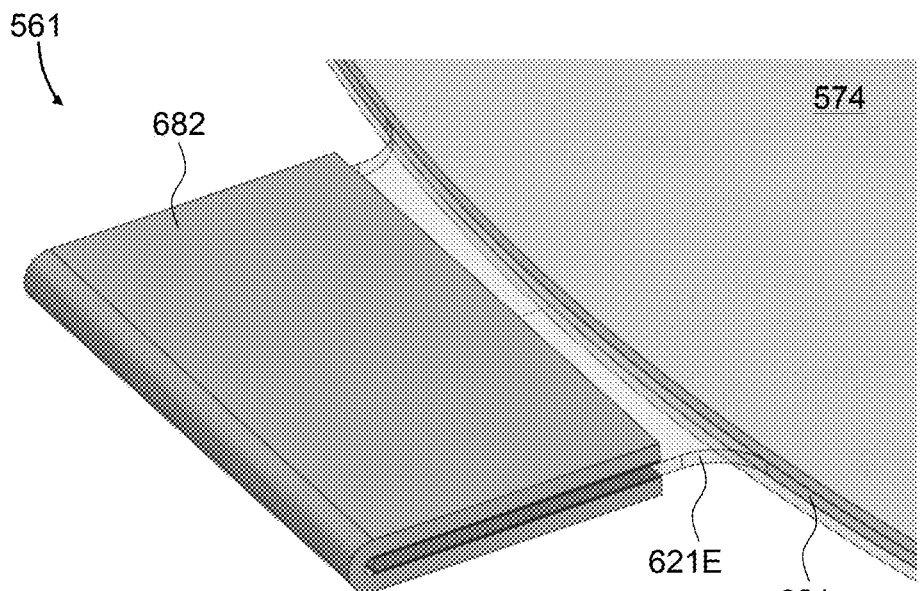
FIG. 7 is a three-dimensional zoomed-in view of a first electrical bridge tab of the optical dimmer of FIG. 5.

Referring to FIG. 7 with further reference to FIG. 6B, the first bridge tab 561 may include an extension 621E of a transparent substrate 621 (FIGS. 6B and 7) supporting the inner transparent electrodes of the first 601 and second 602 active dimming elements. The transparent substrate 621 supports the inner transparent electrodes on its outer surfaces. The first bridge tab 561 includes a flexible layer 682 wrapped around the extension 621E to provide an electrical contact between the inner transparent electrodes of the first 601 and second 602 active dimming elements. The electrical contact may be made using an ACF, for example.

Figure 8:
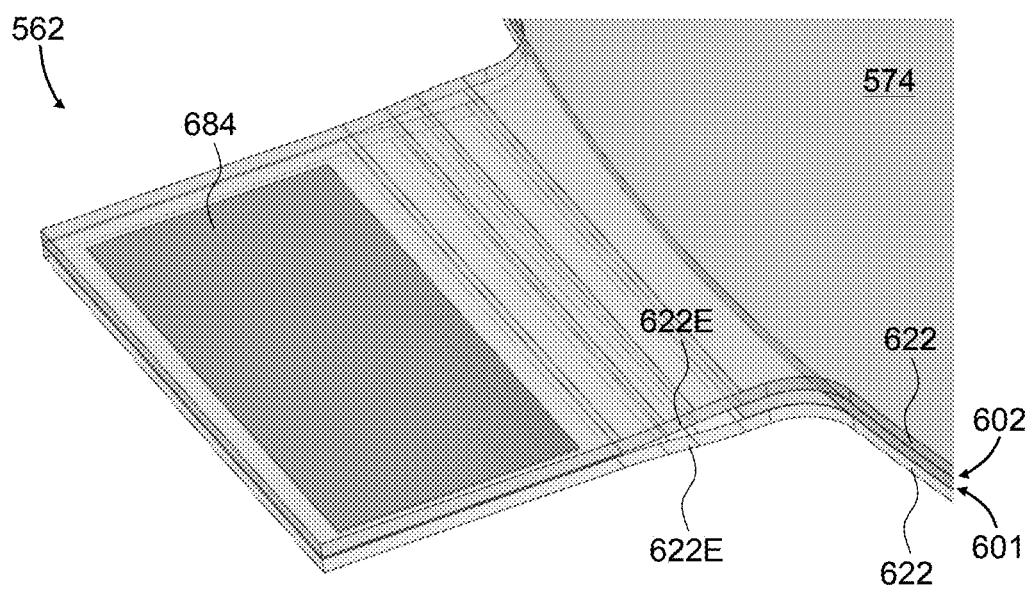
FIG. 8 is a three-dimensional zoomed-in view of a second electrical bridge tab of the optical dimmer of FIG. 5.

Turning now to FIG. 8, the second bridge tab 562 includes extensions 622E of outer transparent substrates 622 supporting outer transparent electrodes of the first 601 and second 602 active dimming elements. The extensions 622E are bent towards each other for providing an electrical contact, e.g. by means of an ACF 684. At least one of the extensions 622E is bent towards the other one to provide the electrical contact between the outer transparent electrodes of the first 601 and second 602 active dimming elements.

Figure 9:
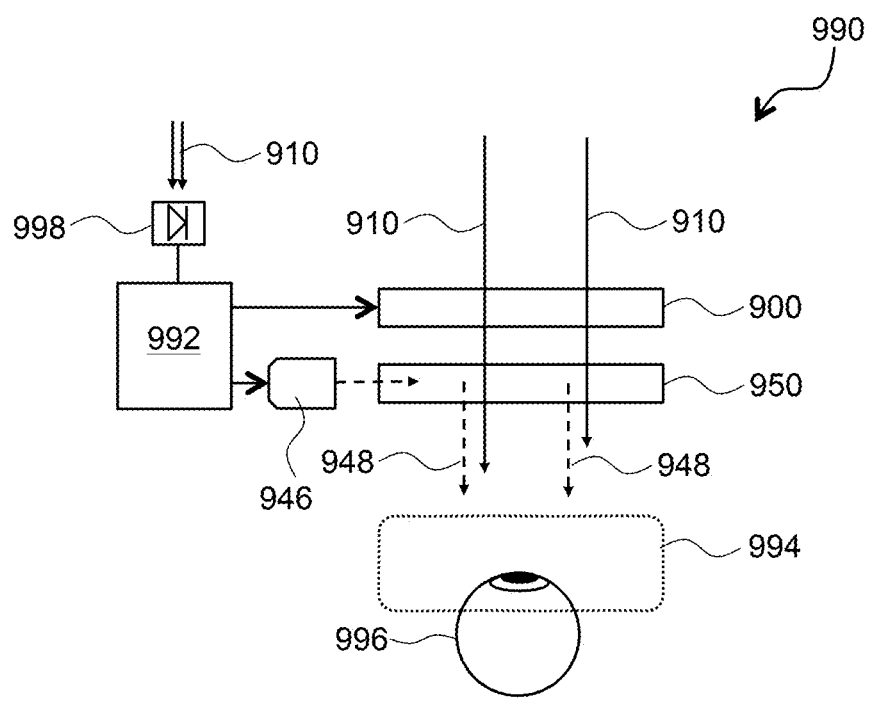
FIG. 9 is a schematic view of a display device including an optical dimmer of this disclosure.

Referring to FIG. 9, a near-eye display 990 includes an optical dimmer 900 for dimming external light 910, and a combiner element 950 in an optical path of the external light 910 downstream of the optical dimmer 900, for adding image light 948 to the external light 910 for combined viewing by an eye 996 of a user of the near-eye display. The display light 948 carries an image to be displayed at an eyebox 994 of the near-eye display 990. The optical dimmer 900 allows the external light 910 to be attenuated to a level where it does not overwhelm the image light 948, enabling a comfortable viewing of an AR image carried by the display light 948.

The optical dimmer 900 may include any of the optical dimmers disclosed herein, such as, for example, the optical dimmer 100 of FIG. 1, the optical dimmers 200A and 200B of FIGS. 2A and 2B respectively, the optical dimmer 300 of FIG. 3, the optical dimmer 400 of FIG. 4, and the optical dimmer 500 of FIG. 5. The combiner element 950 may include a pupil-replicating lightguide i.e. a light guiding plate with an in-coupling and out-coupling gratings, a geometrical waveguide i.e. a light guiding plate with a buried array of out-coupling translucent mirrors, etc. The combiner element 950 may be coupled to a projector 946 that provides the display light 948 carrying an image in angular domain to be displayed to the viewer.

A controller 992 may be operably coupled to the projector 946 and the dimmer 900. The controller 992 may be configured, e.g. wired and/or programmed with software and/or firmware, to cause the optical dimmer 900 to dim the external light 910 more when a brightness of the external light 910 increases, so as to lessen an effect of the external light 910 on legibility of an image conveyed by the image light 948 to the eye 996 of the user. A light sensor 998 may be used to measure the brightness of the external light 910. The controller 992 may receive a signal from the light sensor 998 and, based on a measured magnitude of the signal, determine the degree of dimming/attenuation of the external light 910 that is adequate for the outside brightness.

Figure 10:
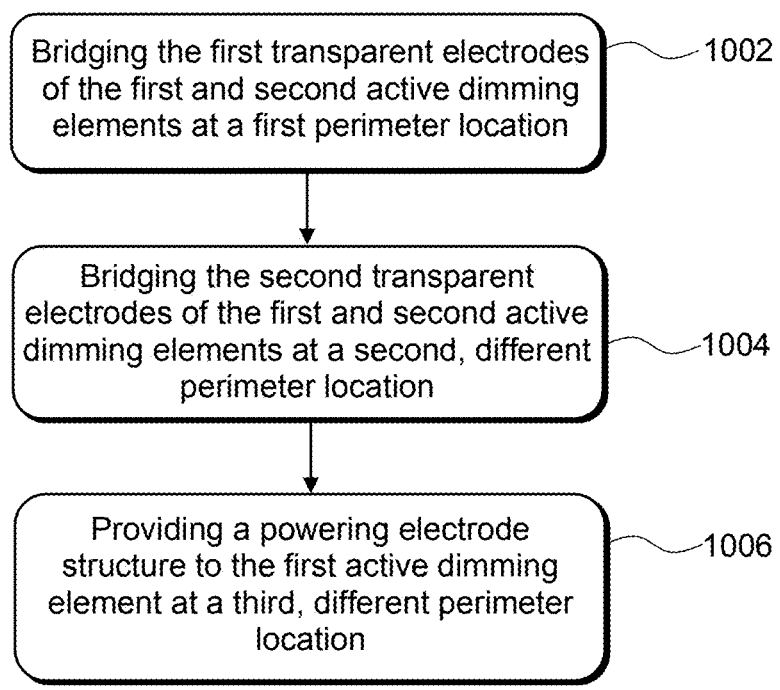
FIG. 10 is a flow chart of a method for wiring an optical dimmer of this disclosure.

Referring to FIG. 10, a method 1000 for wiring an optical dimmer of this disclosure, e.g. the optical dimmer 200A of FIG. 2A, the optical dimmer 200B of FIG. 2B, the optical dimmer 300 of FIG. 3, the optical dimmer 400 of FIG. 4, and/or the optical dimmer 500 of FIG. 5, is presented. The method 1000 includes electrically bridging (1002) the first transparent electrodes of the first and second active dimming elements at a first location at a perimeter of the stack. The second transparent electrodes of the first and second active dimming elements are electrically bridged (1004) at a second location at the perimeter of the stack.

A powering electrode structure is provided (1006) to the first active dimming element at a third location at the perimeter of the stack. The first, second, and third locations are spaced apart from one another along the perimeter of the stack. It is further noted that the numeration of the elements such as transparent electrodes does not imply their order in an optical path of the stream of external light being dimmed or attenuated. The first and second electrical bridges and the powering electrode structure may be spaced apart from one another by an angle of at least 20 degrees, 40 degrees, or 60 degrees w.r.t. an optical axis of the stack.

Figure 11:
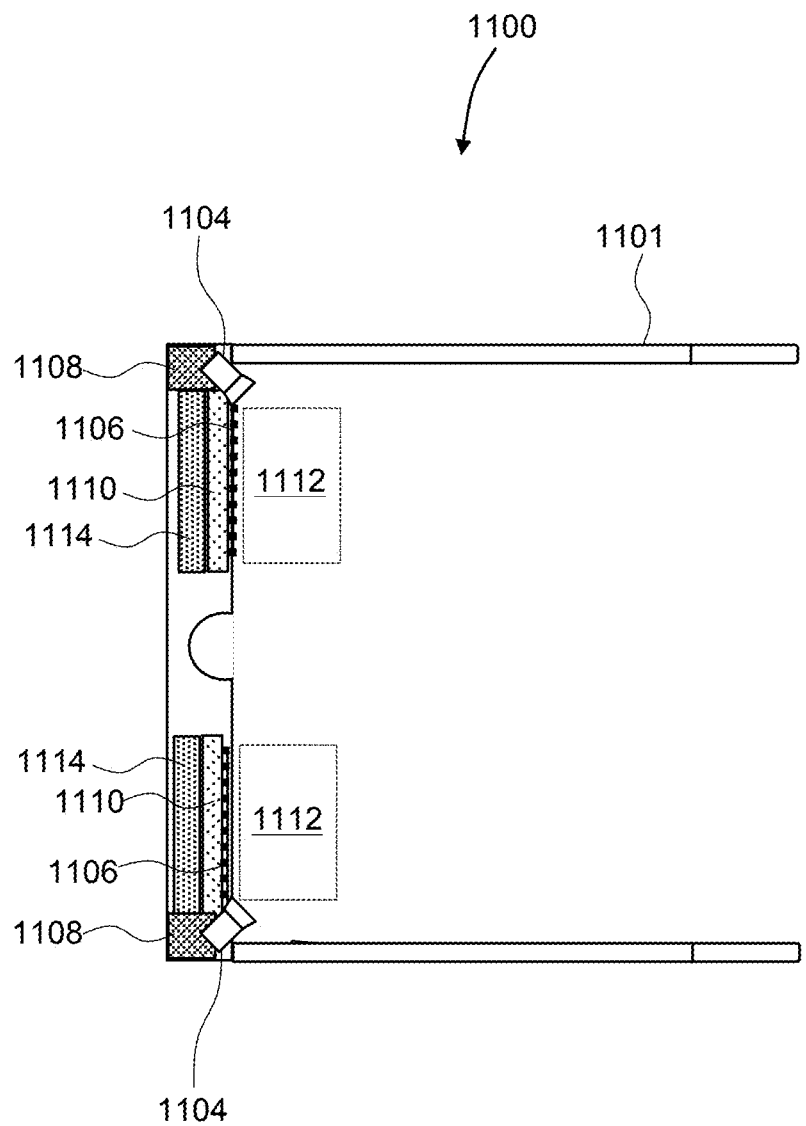
FIG. 11 is a view of an augmented reality (AR) display of this disclosure having a form factor of a pair of eyeglasses.

Referring now to FIG. 11, an augmented reality (AR) near-eye display 1100 in shown in a top view. The AR near-eye display 1100 includes a frame 1101 having a form factor of a pair of eyeglasses. The frame 1101 supports, for each eye: an image projector 1108, a pupil-replicating waveguide 1110 optically coupled to the image projector 1108, an eye-tracking camera 1104, a plurality of illuminators 1106, and an optical dimmer 1114. The optical dimmer 1114 may include any of the optical dimmers disclosed herein. The illuminators 1106 may be supported by the pupil-replicating waveguide 1110 for illuminating an eyebox 1112.

The image projector 1108 provides a fan of light beams carrying an image in angular domain to be projected into a user's eye. The pupil-replicating waveguide 1110 receives the fan of light beams and provides multiple laterally offset parallel copies of each beam of the fan of light beams, thereby extending the projected image. For AR applications, the pupil-replicating waveguide 1110 can be transparent or translucent to enable the user to view the outside world together with the images projected into each eye and superimposed with the outside world view. The images projected into each eye may include objects disposed with a simulated parallax, so as to appear immersed into the real world view.

The purpose of the eye-tracking cameras 1104 is to determine position and/or orientation of both eyes of the user. Once the position and orientation of the user's eyes are known, a gaze convergence distance and direction may be determined. The imagery displayed by the image projectors 1108 may be adjusted dynamically to account for the user's gaze, for a better fidelity of immersion of the user into the displayed augmented reality scenery, and/or to provide specific functions of interaction with the augmented reality.

In operation, the illuminators 1106 illuminate the eyes at the corresponding eyeboxes 1112, to enable the eye-tracking cameras to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with illuminating light, the latter may be made invisible to the user. For example, infrared light may be used to illuminate the eyeboxes 1112.

Figure 12:
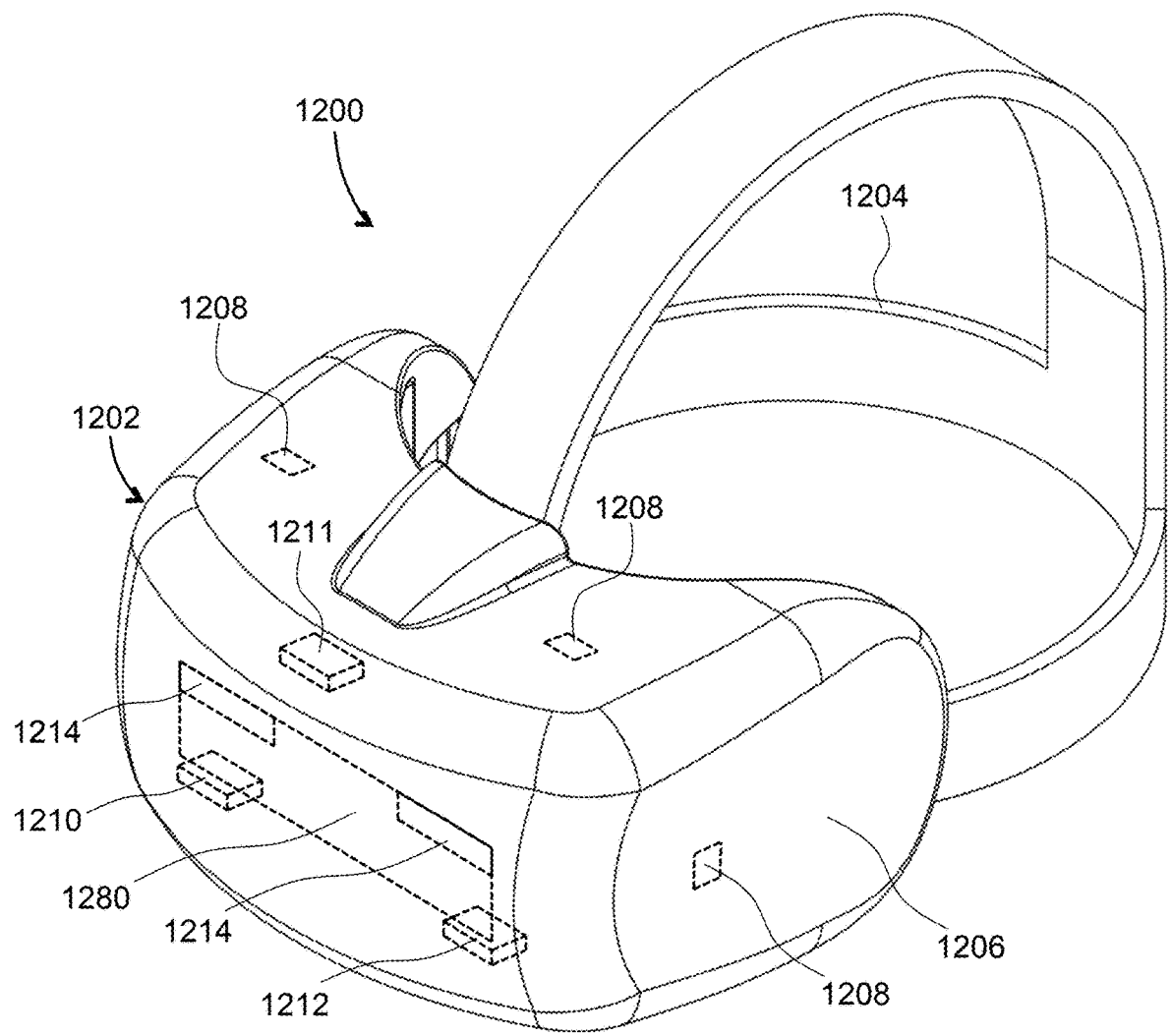
FIG. 12 is a three-dimensional view of a head-mounted display (HMD) of this disclosure.

Turning to FIG. 12, an HMD 1200 is an example of an AR/VR wearable display system which encloses the user's face, for a greater degree of immersion into the AR/VR environment. The HMD 1200 may generate the entirely virtual 3D imagery. The HMD 1200 may include a front body 1202 and a band 1204 that can be secured around the user's head. The front body 1202 is configured for placement in front of eyes of a user in a reliable and comfortable manner. A display system 1280 may be disposed in the front body 1202 for presenting AR/VR imagery to the user. The display system 1280 may include any of the optical dimmers disclosed herein. Sides 1206 of the front body 1202 may be opaque or transparent.

In some embodiments, the front body 1202 includes locators 1208, an inertial measurement unit (IMU) 1210 for tracking acceleration of the HMD 1200, and position sensors 1212 for tracking position of the HMD 1200. The IMU 1210 is an electronic device that generates data indicating a position of the HMD 1200 based on measurement signals received from one or more of position sensors 1212, which generate one or more measurement signals in response to motion of the HMD 1200. Examples of position sensors 1212 include: one or more accelerometers, one or more gyroscopes, one or more magnetometers, another suitable type of sensor that detects motion, a type of sensor used for error correction of the IMU 1210, or some combination thereof. The position sensors 1212 may be located external to the IMU 1210, internal to the IMU 1210, or both external and internal to the IMU 1210.

The locators 1208 are traced by an external imaging device of a virtual reality system, such that the virtual reality system can track the location and orientation of the entire HMD 1200. Information generated by the IMU 1210 and the position sensors 1212 may be compared with the position and orientation obtained by tracking the locators 1208, for improved tracking accuracy of position and orientation of the HMD 1200. Accurate position and orientation is important for presenting appropriate virtual scenery to the user as the latter moves and turns in 3D space.

The HMD 1200 may further include a depth camera assembly (DCA) 1211, which captures data describing depth information of a local area surrounding some or all of the HMD 1200. The depth information may be compared with the information from the IMU 1210, for better accuracy of determination of position and orientation of the HMD 1200 in 3D space.

The HMD 1200 may further include an eye tracking system 1214 for determining orientation and position of user's eyes in real time. The obtained position and orientation of the eyes also allows the HMD 1200 to determine the gaze direction of the user and to adjust the image generated by the display system 1280 accordingly. The determined gaze direction and vergence angle may be used to adjust the display system 1280 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1202.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content.

The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An optical dimmer comprising:
   a first active dimming element that comprises a first pair of transparent electrodes and a first electroactive material positioned between the first pair of transparent electrodes, the first electroactive material having an optical property that is controllable by applying voltage between the first pair of transparent electrodes;
   a second active dimming element that comprises a second pair of transparent electrodes and a second electroactive material positioned between the second pair of transparent electrodes, the second electroactive material having an optical property that is controllable by applying voltage between the second pair of transparent electrodes;
   a first electrical bridge between first transparent electrodes of each of the first and second pairs of transparent electrodes;
   a second electrical bridge between second transparent electrodes of each of the first and second pairs of transparent electrodes;
   a powering structure coupled to the first pair of transparent electrodes of the first active dimming element for applying voltage thereto;
   wherein the first and second electrical bridges and the powering structure are spaced apart from one another along a perimeter of the first and second active dimming elements; and
   a combiner element in an optical path downstream of the optical dimmer.

2. The optical dimmer of claim 1, wherein the first and second electrical bridges and the powering structure are spaced apart from one another by an angle of at least 20 degrees w.r.t. an optical axis of the first and second dimming elements.

3. The optical dimmer of claim 1, further comprising first and second peripheral electrode structures electrically coupled to periphery of the first pair and the second pair of transparent electrodes, respectively.

4. The optical dimmer of claim 3, wherein the first and second peripheral electrode structures each comprise a conductive ring running around a respective conductive electrode.

5. The optical dimmer of claim 1, further comprising:
   a third electrical bridge between the first transparent electrodes of each of the first and second pairs of transparent electrodes; and
   a fourth electrical bridge between the second transparent electrodes of each of the first and second pairs of transparent electrodes;
   wherein the first to fourth electrical bridges and the powering structure are spaced apart from one another along a perimeter of the first and second active dimming elements.

6. The optical dimmer of claim 1, wherein the powering structure comprises a tab formed by extensions of the first and second transparent electrodes of the first active dimming element, wherein at least one of the extensions is bent away from another extension to form a gap.

7. The optical dimmer of claim 6, further comprising an insulating edge sealant filling the gap.

8. The optical dimmer of claim 1, wherein the first electrical bridge comprises a tab formed by an extension of a substrate supporting the first transparent electrodes of each of the first and second pairs of transparent electrodes, wherein the tab comprises a flexible layer wrapped around the extension to provide an electrical contact between the first transparent electrodes of each of the first and second pairs of transparent electrodes.

9. The optical dimmer of claim 1, wherein the second electrical bridge comprises a tab formed by extensions of the second transparent electrodes of each of the first and second pairs of transparent electrodes, wherein at least one of the extensions is bent towards another extension to provide an electrical contact between the second transparent electrodes of each of the first and second pairs of transparent electrodes.

10. The optical dimmer of claim 1, wherein the first and second active dimming elements each further comprise first and second transparent substrates supporting each of the first and second pairs of transparent electrodes, respectively, wherein the electroactive material comprises liquid crystals.

11. The optical dimmer of claim 10, wherein the liquid crystals comprise guest-host liquid crystals.

12. The optical dimmer of claim 10, wherein the first and second active dimming elements each further comprise a linear transmission polarizer supported by the first transparent substrate.

13. A near-eye display comprising:
an optical dimmer for dimming external light, the optical dimmer comprising:
a first active dimming element that comprises a first pair of transparent electrodes and a first electroactive material positioned between the first pair of transparent electrodes, the first electroactive material having an optical property controllable by applying voltage between the first pair of transparent electrodes;
a second active dimming element that comprises a second pair of transparent electrodes and a second electroactive material positioned between the second pair of transparent electrodes, the second electroactive material having an optical property that is controllable by applying voltage between the second pair of transparent electrodes;
a first electrical bridge between first transparent electrodes of each of the first and second pairs of transparent electrodes;
a second electrical bridge between second transparent electrodes of each of the first and second pairs of transparent electrodes;
a powering structure coupled to the first and second transparent electrodes of the first active dimming element for applying voltage thereto;
wherein the first and second electrical bridges and the powering structure are spaced apart from one another along a perimeter of the first and second active dimming elements; and
a combiner element in an optical path of the external light downstream of the optical dimmer for adding image light to the external light for viewing by an eye of a user of the near-eye display.

14. The near-eye display of claim 13, wherein the combiner element comprises a pupil-replicating lightguide in a stack configuration with the optical dimmer.

15. The near-eye display of claim 13, further comprising a controller for causing the optical dimmer to dim the external light more when a brightness of the external light increases, so as to lessen an effect of the external light on legibility of an image conveyed by the image light to the eye of the user.

16. The near-eye display of claim 13, wherein the powering structure comprises a tab formed by extensions of the first and second transparent electrodes of the first active dimming element, wherein at least one of the extensions is bent away from another extension to form a gap.

17. The near-eye display of claim 16, further comprising an insulating edge sealant filling the gap.

18. The near-eye display of claim 13, wherein at least one of:
the first electrical bridge comprises a tab formed by an extension of a substrate supporting the first transparent electrodes of each of the first and second pairs of transparent electrodes, wherein the tab comprises a flexible layer wrapped around the extension to provide an electrical contact between the first transparent electrodes of each of the first and second pairs of transparent electrodes; or
the second electrical bridge comprises a tab formed by extensions of the second transparent electrodes of each of the first and second pairs of transparent electrodes, wherein at least one of the extensions is bent towards another extension to provide an electrical contact between the second transparent electrodes of each of the first and second pairs of transparent electrodes.

19. A method for wiring an optical dimmer comprising a stack of first and second active dimming elements each comprising a first pair of transparent electrodes and a first electroactive material positioned between the first pair of transparent electrodes, and a second pair of transparent electrodes and a second electroactive material positioned between the second pair of transparent electrodes, wherein the first and second electroactive material has an optical Property that is controllable by applying voltage between the first pair of transparent electrodes and between the second pair of transparent electrodes, the method comprising:
electrically bridging the first transparent electrodes of each of the first and second pairs of transparent electrodes at a first location at a perimeter of the stack;
electrically bridging the second transparent electrodes of each of the first and second pairs of transparent electrodes active dimming elements at a second location at the perimeter of the stack;
providing a powering electrode structure to the first active dimming element at a third location at the perimeter of the first and second active dimming elements; and
wherein the first, second, and third locations are spaced apart from one another along the perimeter of the first and second active dimming elements; and
providing a combiner element in an optical path downstream of the optical dimmer.

20. The method of claim 19, further comprising spacing apart the first, second, and third locations by an angle of at least 20 degrees from one another w.r.t. an optical axis of the stack.

* * * * *